(12) United States Patent
Kawashima (10) Patent No.: US 8,311,326 B2
(45) Date of Patent: Nov. 13, 2012

(54) IMAGE PROCESSING USING BACKGROUND ESTIMATION AND REMOVAL (75) Inventor: Masahiro Kawashima, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 663 days.

(21) Appl. No.: 12/458,990

(22) Filed: Jul. 29, 2009

(65) Prior Publication Data
US 2010/0027887 A1 Feb. 4, 2010

(30) Foreign Application Priority Data

Jul. 31, 2008 (JP) ................................. 2008-198564
Nov. 6, 2008 (JP) ................................. 2008-285754
Jul. 29, 2009 (JP) ................................. 2009-176213

(51) Int. Cl.
G06K 9/00 (2006.01)
G06K 9/40 (2006.01)

(52) U.S. Cl. .......................... 382/168; 382/172; 382/254

(58) Field of Classification Search .................. None
See application file for complete search history.

(56) References Cited

U.S. PATENT DOCUMENTS

| 5,699,454 A * | 12/1997 | Nakai et al. | 382/172 |
| 5,831,748 A * | 11/1998 | Tsukada et al. | 382/169 |
| 5,926,579 A * | 7/1999 | Uejo et al. | 382/272 |
| 6,333,993 B1 * | 12/2001 | Sakamoto | 382/173 |
| 6,363,162 B1 * | 3/2002 | Moed et al. | 382/112 |
| 2006/0280366 A1 * | 12/2006 | Ahmed et al. | 382/176 |
| 2007/0140577 A1 * | 6/2007 | Ahmed | 382/254 |

FOREIGN PATENT DOCUMENTS

| JP | 4-313774 A | 11/1992 |
| JP | 7-303188 A | 11/1995 |
| JP | 2000-101839 A | 4/2000 |

* cited by examiner

Primary Examiner — Li Liu
(74) Attorney, Agent, or Firm — Nath, Goldberg & Meyer; Jerald L. Meyer; Stanley N. Protigal (57) ABSTRACT A histogram preparer reads image data scanned from an original sheet by the line, preparing a histogram of pixel numbers of respective background densities of a read line, a background density estimator estimates a background density of the read line as a density at a local maximal value in view of a highlight end of the histogram, a background removal reference value setter sets up a background removal reference value as a reference margin based on a pixel number normalized on the estimated background density, a background removal threshold determiner increments the estimated background density by the background removal reference value to set a provisional background removal threshold of the read line, and determines a background removal threshold of the read line as a weighting combination of the provisional background removal threshold and a background removal threshold of a previous line, and a background remover removes a background of the read line based on the determined background removal threshold.

13 Claims, 11 Drawing Sheets

IMAGE PROCESSING USING BACKGROUND ESTIMATION AND REMOVAL

BACKGROUND OF THE INVENTION

1. Field of the Invention

The present invention relates to an image processing system and an image processing method, and particularly, to an image processing system and an image processing method in which an original sheet is scanned to obtain a set of image data, and a background on the original sheet is removed from the set of image data by setting up a threshold for the removal.

2. Description of Related Arts

In the copying by printing, an image scanner scans various types of sheets as an original. Some of sheets used as an original, including a newspaper, a recycled paper, and a colored paper, for instance, have relatively high background densities. Scanning such an original sheet requires a process of removing a background, as known in the art. This process serves for clarification of letters on a copied sheet, permitting reduction of ink or toner consumption in printing.

The removal of background generally includes: estimating a background density of original sheet after an image processing; determining a threshold depending on the density; and defining a set of pixels of values not over the threshold, as a background to be removed from a frame of image data, as a series of processes uneasy to execute. As a technique to determine 'a threshold for background removal' (referred herein to as 'a background removal threshold'), among three patent documents listed below, the patent document 1 (Japanese Patent Application Laid-Open Publication No. 4-313774) has disclosed: using a set of image data scanned in a pre-scan of an original sheet, for preparing a histogram within a range of background density based on the set of image data of the original sheet, to thereby determine a background removal threshold; and implementing a removal of background from a set of image data scanned in a main scan of the original sheet. The patent document 2 (Japanese Patent Application Laid-Open Publication No. 2000-101839) has disclosed determining a background removal threshold by one page of image data. The patent document 3 (Japanese Patent Application Laid-Open Publication No. 7-303188) has disclosed a method of using a histogram to determine a background removal threshold, including a dispersion calculation for determining how far peaks are spaced from each other in the histogram, to thereby determine a background removal threshold.

SUMMARY OF THE INVENTION

The patent document 1 as well as the patent document 2 has disclosed a technique of determining a background removal threshold by the page as a unit. The background removal threshold is thus determined after a pre-scan or a scanning of one page of image data, resulting in a delayed background removal process, as an issue. The patent document 3 has disclosed a technique requiring a calculation of dispersion based on a histogram, with a complicated processing, as an issue.

The present invention has been devised in view of such issues. It is an object of the present invention to provide an image processing system and an image processing method adapted for a facilitated, high-speed determination of background removal threshold.

To achieve the object described, according to a first aspect of the present invention, an image processing system comprises a histogram preparer configured to read in order a set of image data scanned from an original by a prescribed unit of reading thereof, and prepare a histogram representing pixel numbers of densities of image data of an N-th read pixel region, where N is an integer variable up to a maximum as a number of order of reading at a time the set of image data is read through, a background density estimator configured to estimate a background density of the original as a density corresponding to a local maximal value in view of a highlight end of the histogram as prepared, a background removal reference value setter configured to set up a background removal reference value based on a pixel number corresponding to the background density as estimated, a background removal threshold determiner configured to set up an N-th provisional background removal threshold as a sum of the background density as estimated and the background removal reference value as set up, and determine a background removal threshold of image data of the N-th read pixel region based on the N-th provisional background removal threshold and a background removal threshold of image data of an (N−1)-th read pixel region, and a background remover configured to remove a background of image data of the N-th read pixel region based on the background removal threshold of image data of the N-th read pixel region.

To achieve the object described, according to a second aspect of the present invention, an image processing method comprises the steps of reading in order a set of image data scanned from an original by a prescribed unit of reading thereof, preparing a histogram representing pixel numbers of densities of image data of an N-th read pixel region, where N is an integer variable up to a maximum as a number of order of reading at a time the set of image data is read through, estimating a background density of the original as a density corresponding to a local maximal value in view of a highlight end of the histogram as prepared, setting up a background removal reference value based on a pixel number corresponding to the background density as estimated, setting up an N-th provisional background removal threshold as a sum of the background density as estimated and the background removal reference value as set up, determining a background removal threshold of image data of the N-th read pixel region based on the N-th provisional background removal threshold and a background removal threshold of image data of an (N−1)-th read pixel region, and removing a background of image data of the N-th read pixel region based on the background removal threshold of image data of the N-th read pixel region.

DETAILED DESCRIPTION OF THE EMBODIMENTS

Figure 1:
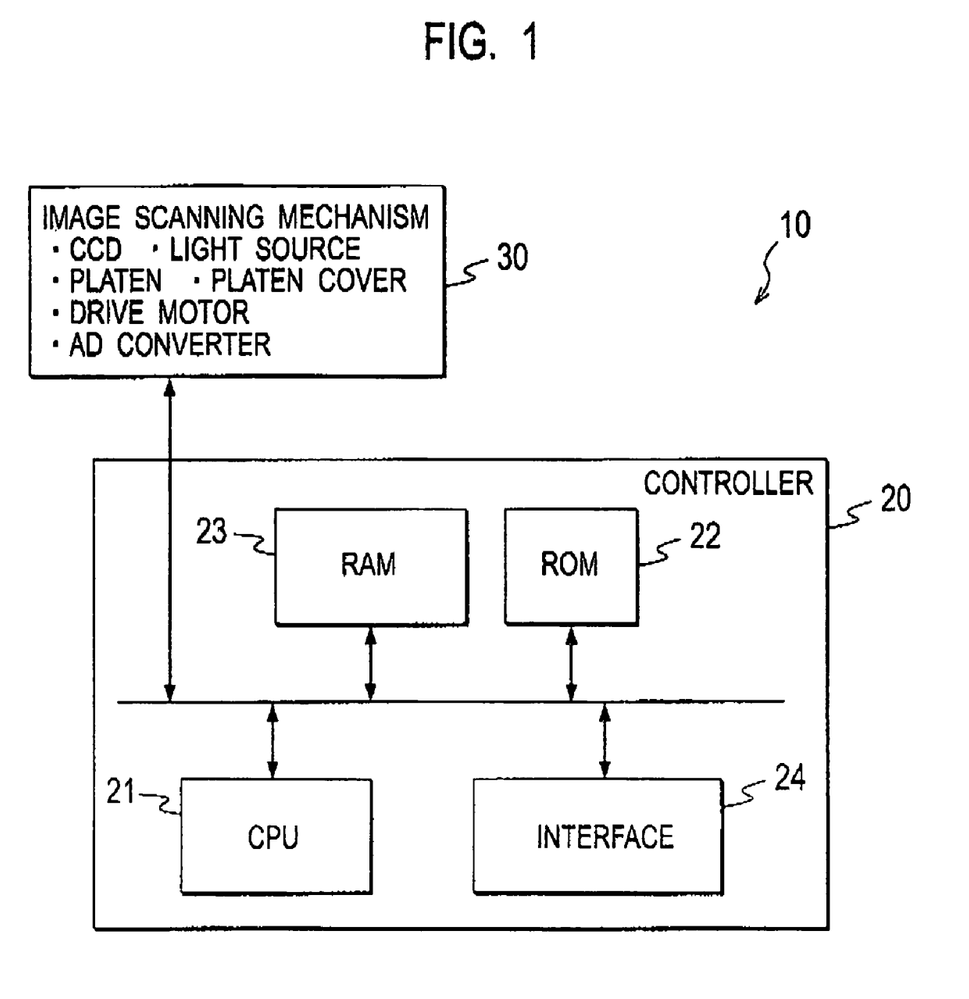
FIG. 1 is a block diagram of a hardware configuration of an image scanner as an image processing system according to an embodiment of the present invention.

There will de described embodiments of the present invention with reference to the drawings. FIG. 1 is a block diagram of a hardware configuration of an image scanner 10 according to an embodiment of the present invention. As illustrated in the figure, the image scanner 10 includes an image scanning mechanism 30, and a controller 20. The image scanner 10 is adapted for processing data of images on an original sheet as scanned by the image scanning mechanism 30, to remove those of a background on the original sheet, to output the rest to an external device.

The image scanning mechanism 30 includes a light source, a platen, a platen cover, a CCD as an image-taking array of charge-coupled devices, a drive motor for CCD scan, an AD converter for converting CCD output signals to digital signals, etc. The light source irradiates an exposed side of an original sheet put on the platen, of which reflection is scanned by the CCD to pick up data of a frame of images on the exposed side of original sheet. The platen cover serves to pressingly hold the sheet on the platen, blocking external light. The platen cover has a white color that affords to scan any size of sheet smaller than a CCD scan area with minimized disturbances on image data. The platen cover may be configured as an automatic sheet feeder.

The controller 20 includes a CPU 21, a ROM 22, a RAM 23, and an interface 24. The CPU 21 follows programs stored in the ROM 22 for a processing to control sheet scanning optical actions of the image scanning mechanism 30, while executing an image processing for removal of a background of original sheet from data of scanned images. The RAM 23 then provides working areas, as necessary. The interface 24 interfaces communications with an external device such as an USB using a prescribed protocol.

Figure 2:
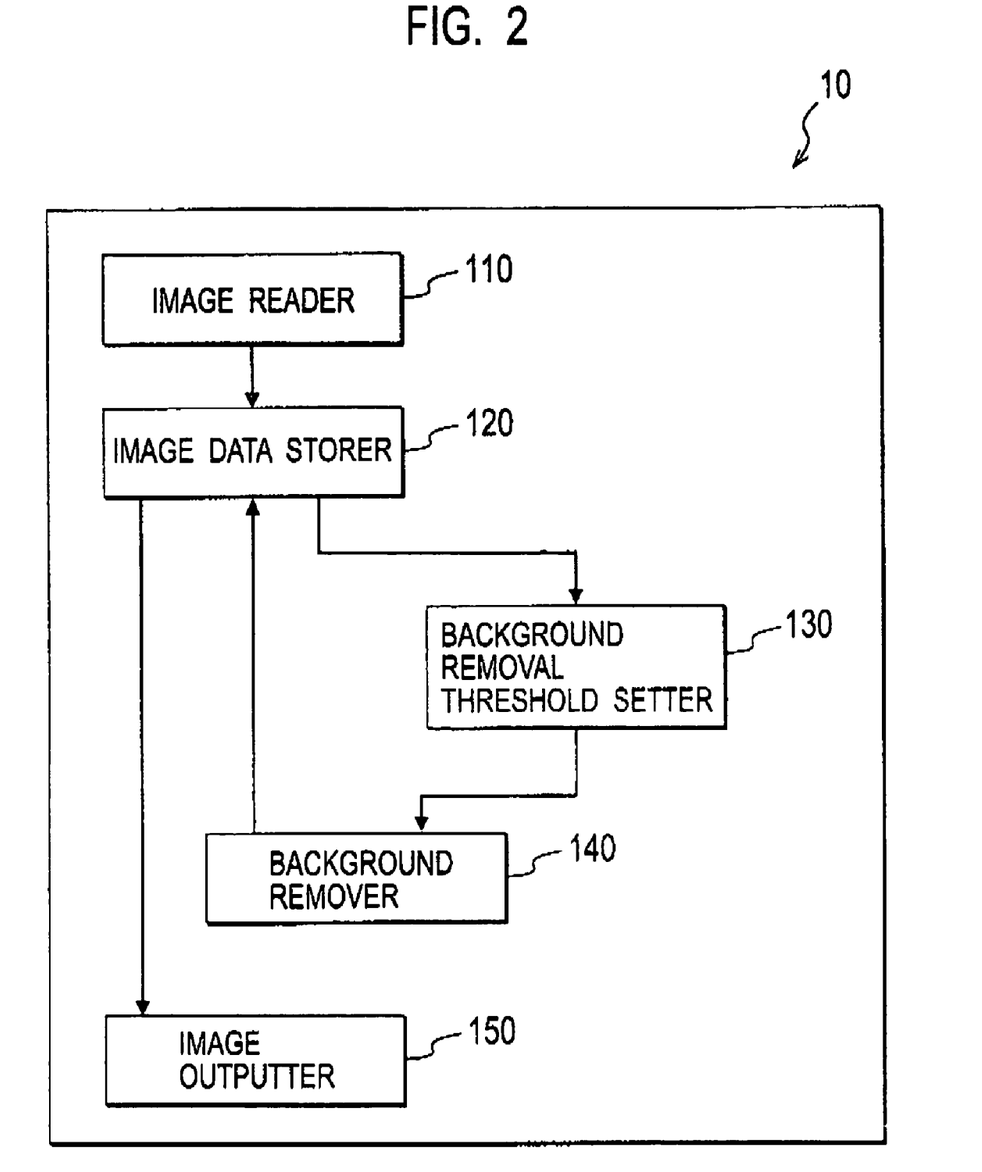
FIG. 2 is a block diagram of a set of processing elements associated with a background removal processing of the image scanner.

FIG. 2 is a block diagram of a set of processing elements associated with the background removal processing of the image scanner 10. As illustrated in the figure, the image scanner 10 includes an image reader 110, an image data storer 120, a background removal threshold setter 130, a background remover 140, and an image outputter 150. Those processing elements includes program elements processable at the CPU 21, though being implemented in part as hardware in terms of subsets of components of controller 20 and image scanning mechanism 30 in FIG. 1 working solely or in combination, as necessary, for their processing. For instance, the image reader 110 includes an optical scanning system of the image scanning mechanism 30, the image data storer 120 includes a physical memory system of the RAM 23, and the image outputter 150 includes a connection circuit system of the interface 24.

The image reader 110 is configured for reading an original sheet on the platen to produce a frame of binary image data. The image data storer 120 is configured to store each frame of image data produced by the image reader 110. It provides working areas as necessary for removal of a background of image data. The background removal threshold setter 130 is configured to read one line after one line as a row of a frame of image data from the image data storer 120, and set up a background removal threshold for that line. That is, in this embodiment, there is a background removal threshold set up for a respective line, to execute a background removal by the line as a unit. The background removal can thus be done at a high processing rate. The background remover 140 is configured to execute a removal of background from a frame of image data in the image data storer 120, by the line as a unit, in accordance with an associated background removal threshold set up by the background removal threshold setter 130. The image outputter 150 is configured to output a frame of image data having got rid of a background thereof, to an external system.

Figure 3:
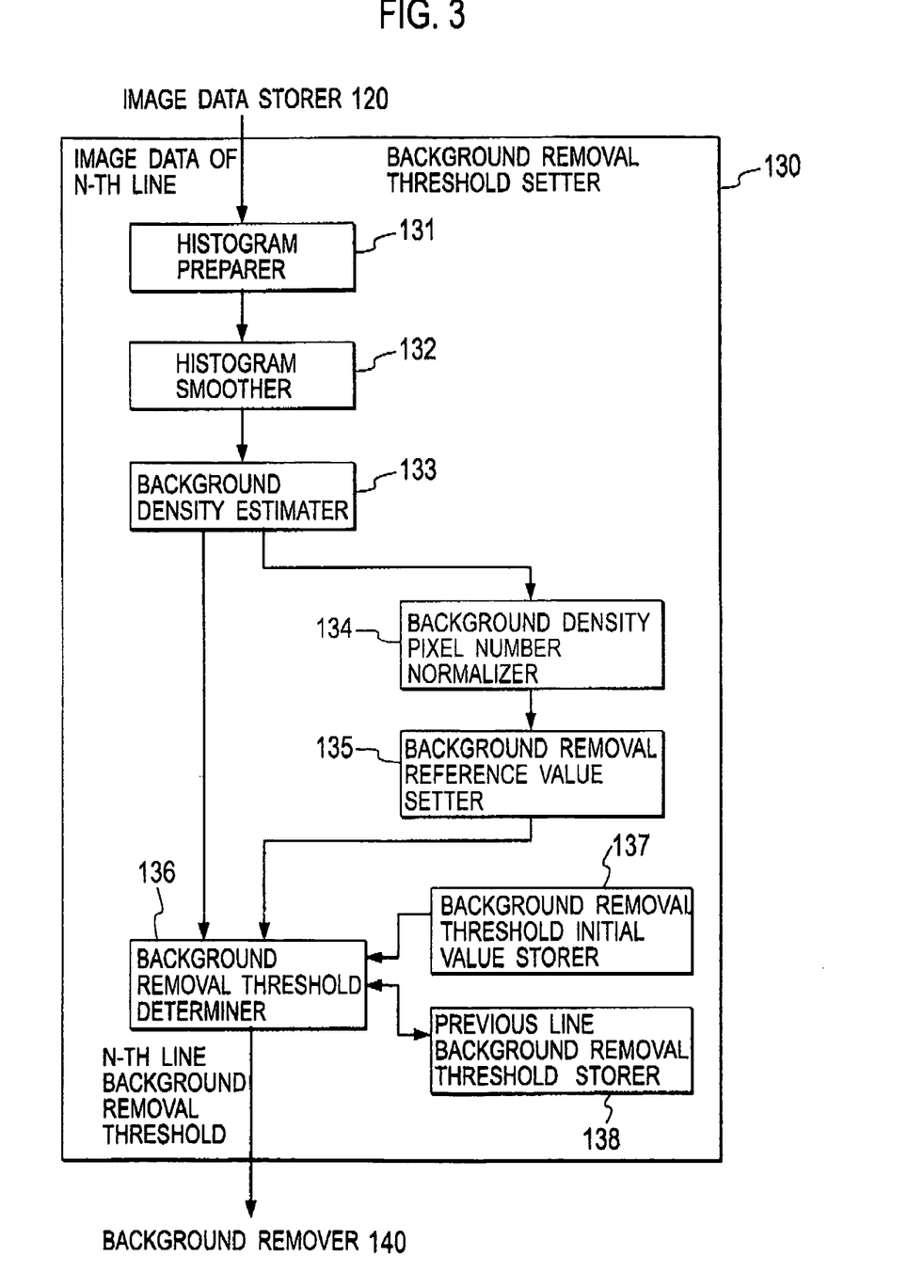
FIG. 3 is a block diagram of a background removal threshold setter as an element of the set of processing elements.

FIG. 3 is a block diagram of the background removal threshold setter 130. As illustrated in the figure, the background removal threshold setter 130 includes a histogram preparer 131, a histogram smoother 132, a background density estimator 133, a background density pixel number normalizer 134, a background removal reference value setter 135, a background removal threshold determiner 136, a background removal threshold initial value storer 137, and a previous line background removal threshold storer 138.

The histogram preparer 131 reads image data stored in the image data storer 120, by one line, to thereby prepare a histogram. That is, there is a histogram prepared by pixels values of a single line, not a single page.

Figure 4A:
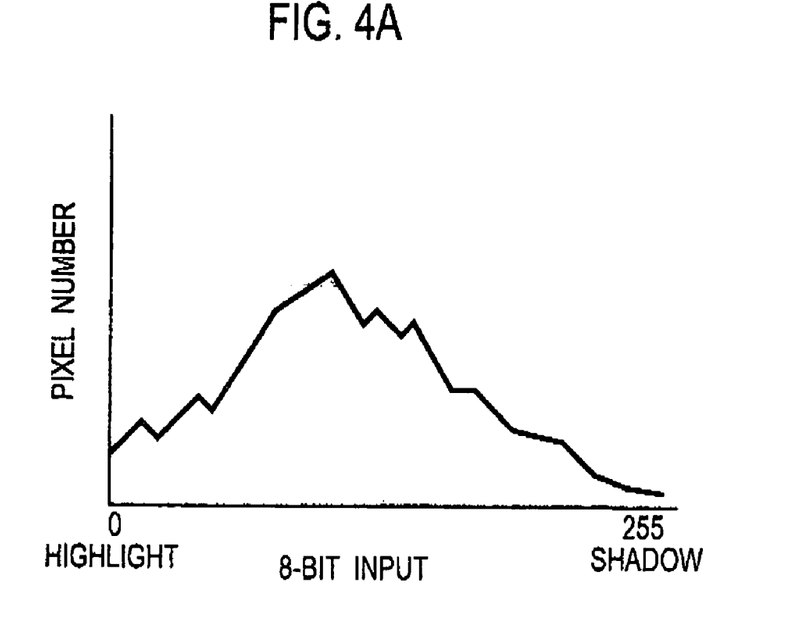
FIGS. 4A and 4B are diagrams illustrating a histogram smoothing process of the background removal threshold setter.

The histogram may be prepared by mapping a respective pixel value of read image data to a luminance. In this respect, among RGB data of a pixel, the G (green) data is most representative of the luminance, so histograms in this embodiment are prepared by values of G data. Assuming an 8-bit data for G of each pixel, resultant histograms have a horizontal axis representing a range of densities from '0' to '255', and a vertical axis representing a range of pixel numbers. A total number of pixels are even to the number of pixels constituting one line. That is, the histograms each cover a whole status range of a line of an original sheet, from a status of a '0' where an entire pixel region of the line is assumed as an image, to a status of '255' where it is assumed as a background. The background density is thinnest (highlight) at the '0', and most dense (shadow) at the '255'. FIG. 4A illustrates a histogram of 8-bit input data.

Figure 4B:
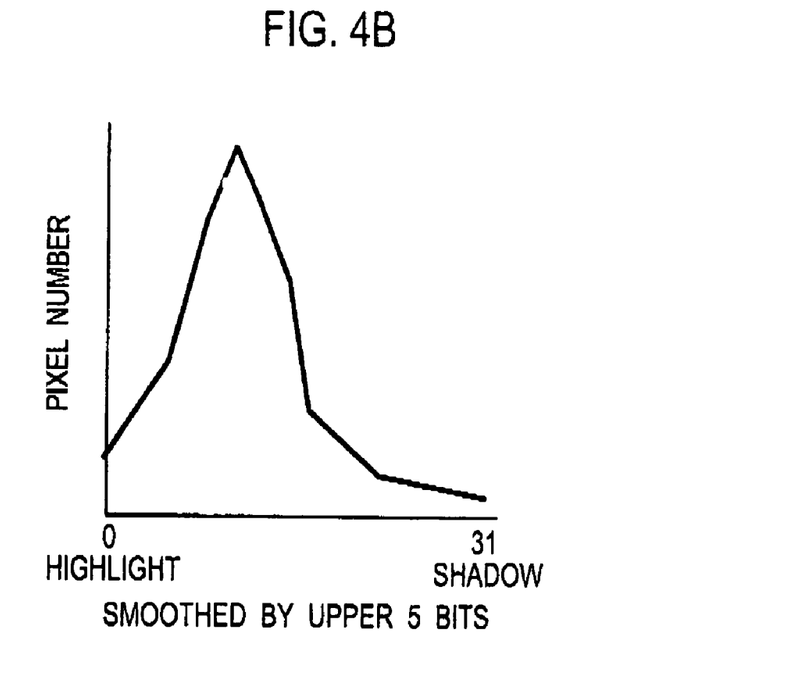

The histogram smoother 132 makes smooth an indented envelope of a histogram of 8-bit input data prepared by the histogram preparer 131. In this embodiment, it takes upper five bits of 8-bit data to thereby reconstruct a smoothed histogram, as illustrated in FIG. 4B. As will be described later on, this embodiment estimates a density of background, by detecting a peak (as a local maximal value) nearest to the highlight end of histogram. Therefore, over-defined ups and downs in envelope of histogram, if left without smoothing, may cause an undue detection of background density. The smoothing by upper five bits provides an accuracy of 32 steps at intervals of eight steps in terms of 255 steps of 8-bit input, allowing for a sufficiently smooth practical envelop. In addition, deviations of eight steps relative to the 255 steps are of no matter in practice. It is noted that four-step intervals by upper six bits would render insufficient smoothing, and 16-step intervals by upper four bits may provide a background density with a probable excessive deviation.

Figure 5A:
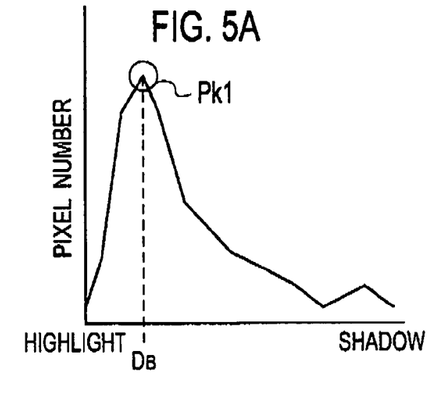
FIGS. 5A to 5F are diagrams illustrating techniques for detection of a density of background by the background removal threshold setter.
Figure 5B:
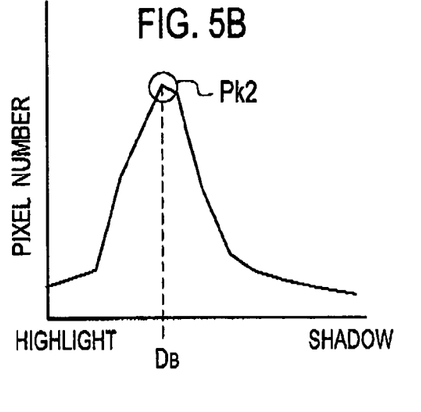

The background density estimator 133 estimates a background density $D_B$ based on a smoothed histogram. Fundamentally, the background density $D_B$ is estimated as a density of background corresponding to the first or nearest peak (maximal value) in relation to the highlight end of a given histogram. This permits a facilitated estimation of background density $D_B$. For instance, in FIG. 5A that illustrates a histogram of an original sheet that is near white with a thin background, the first peak Pk1 appears at a corresponding density, which is taken to estimate as a background density $D_B$. FIG. 5B illustrates a histogram of an original sheet such as a newspaper that has a dense background, the first peak Pk2 appears at a corresponding density, which is taken to estimate as a background density $D_B$.

Figure 5C:
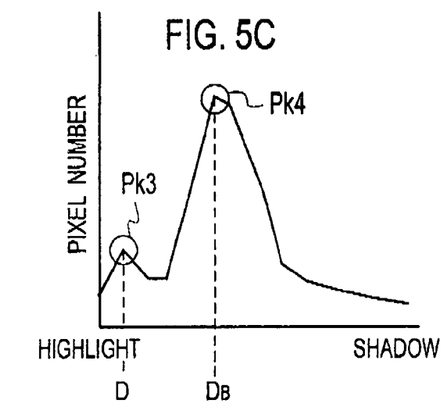
Figure 5D:
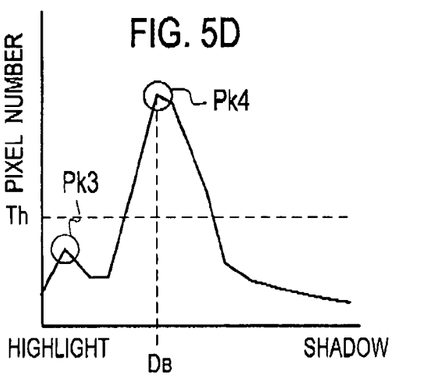
Figure 5E:
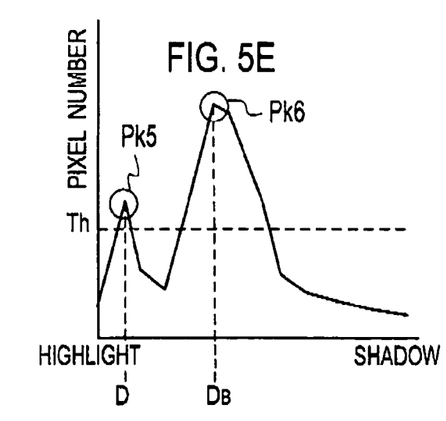

However, as illustrated in FIG. 5C, there may be a peak Pk3 appearing with a small pixel number, at a corresponding density, which may be erroneously determined as a background density $D_B$. To this point as illustrated in FIG. 5D, there is a threshold Th of pixel number set up for recognizing no peaks within a range of pixel numbers equal to or smaller than the threshold Th, to thereby prevent erroneous determinations. In this case, in relation to the highlight end, the first peak Pk4 exceeding the threshold Th is to be hit for detection.

For original sheets smaller in any dimension than a reading range of CCD, a resultant frame of image data includes an image of the platen cover. Such a frame of image data provides a histogram with an increased pixel number at a density corresponding to a color of the platen cover. The platen cover is white-colored for a minimized adverse effect to read image data, and in some cases, as illustrated in FIG. 5C, it gives a peak Pk5 exceeding the threshold Th at a nearer side to the highlight end. This peak 5k is irrelevant to any background on any sheet, and should be checked off.

Figure 5F:
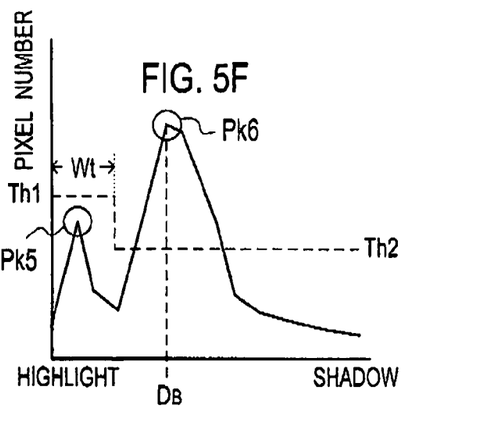

Accordingly, as illustrated in FIG. 5F, there are two pixel number thresholds Th1 and Th2 set up such that Th1>Th2. The threshold Th1 is applied over densities in a range of Wt from the highlight end that corresponds to a platen cover color, and the threshold Th2 smaller than the threshold Th1 is applied over densities in the remaining range. Therefore, the peak Pk5 due to the platen cover color is unrecognizable. And, in relation to the highlight end, the first peak Pk6 exceeding the threshold Th2 is to be hit for detection.

The threshold Th can be designated as a proportion to the total number of pixels in a histogram. For instance, the threshold Th may be designated as an n % of whole pixels, such that threshold Th=(pixel number of one line×n)/100. How to determine a specific n should be empirical for each of thresholds Th1 and Th2. Also for application range of the threshold Th1, the width Wt should be pre-designated in accordance with the platen cover's color or such.

Figure 6:
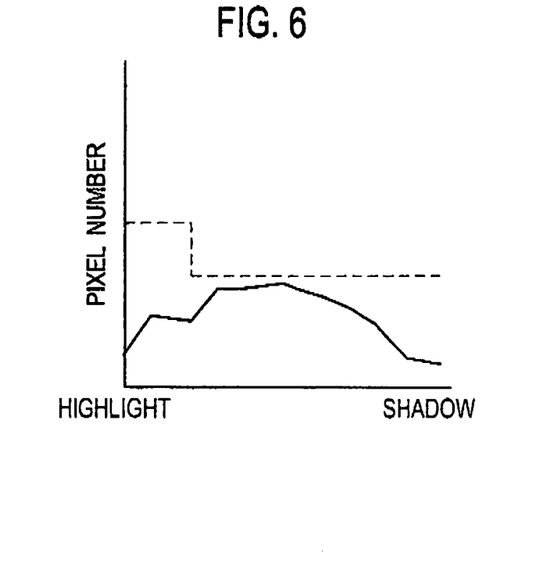
FIG. 6 is a diagram illustrating a state of the background removal threshold setter failing to detect a background density.

FIG. 6 illustrates a state of the background density estimator 133 failing to detect a peak exceeding a threshold. In such a state, it informs the background removal threshold determiner 136 of the failure in detection of a background density $D_B$ to be estimated. As will be described later on, for any line in which no peak exceeding a threshold is detected, the background removal is to be made in conformity with a criterion for background removal applied to the previous line (refer to step S108 in FIG. 10). This is why a failed detection of background density $D_B$ in a concerned line is output to the background removal threshold determiner 136.

The background density pixel number normalizer 134 normalizes a pixel number that corresponds to a background density $D_B$ estimated by the background density estimator 133. The total number of pixels in a line varies depending on the resolution and the width of original sheet. Therefore, the pixel number at the estimated background density $D_B$ is normalized before determination of a later-described background removal reference value. In this embodiment, the normalization is made to a range of pixel numbers from 0 to 1000, by an expression, such that "normalized pixel number at a background density"="pixel number at the background density"×1000/"number of pixels in one line".

Figure 7A:
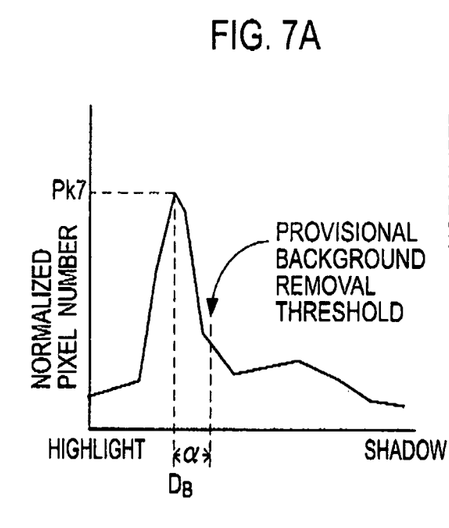
FIGS. 7A and 7B are diagrams illustrating a reference value for background removal (referred herein to as a background removal reference value) in the background removal threshold setter.
Figure 7B:
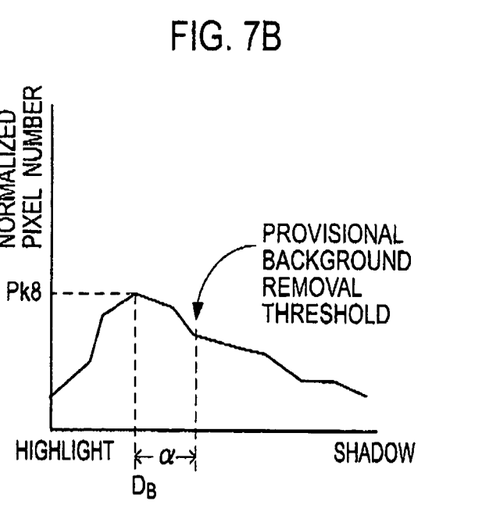

The background removal reference value setter 135 sets up a background removal reference value α as a reference of margin to a background removal threshold at an estimated background density $D_B$. As illustrated in FIGS. 7A and 7B, the background removal reference value α is added to the estimated background density $D_B$, as an amount of increment at the shadow side. For any line, the addition of an estimated background density $D_B$ of the line and a background removal reference value α set thereto provides a value ($D_B$+α) as a provisional background removal threshold of the line. This is handled as a provisional for a final background removal threshold to be determined relative to a background removal threshold of a previous line, as will be described later on. However, for a simplified processing, the value ($D_B$+α) of an estimated background density $D_B$ as incremented by a background removal reference value α may well be taken as a background removal threshold of a current line.

For any estimated background density $D_B$, the background removal reference value α is set with a tendency to: get smaller as a pixel number normalized on the background density $D_B$ becomes larger, or get larger as the normalized pixel number becomes smaller. This is because a general tendency is assumed in an imaginary histogram having a distribution of pixel numbers normalized over an entire range of background densities, such that: as illustrated in FIG. 7A, the larger the normalized pixel number becomes, the steeper the crest of a peak (Pk7) would be, at a background density $D_B$ to be estimated therefrom with a decreased deviation; and as illustrated in FIG. 7 B, the smaller the normalized pixel number becomes, the more gentle the crest of a peak (Pk8) would be, at a background density $D_B$ to be estimated therefrom with an increased deviation.

Figure 8:
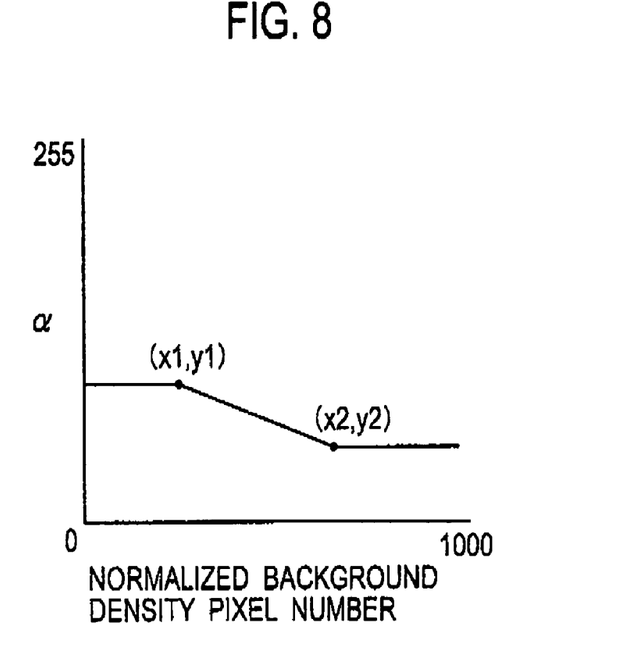
FIG. 8 is a diagram illustrating a method of setting the background removal reference value by the background removal threshold setter.

FIG. 8 illustrates an example of a setting method of background removal reference value α. This example employs a function to determine a background removal reference value α depending on a normalized pixel number at an arbitrary estimated background density $D_B$. This function is defined such that:

α=y1, for an arbitrary normalized pixel number x smaller than x1;

α=y2, for an arbitrary normalized pixel number x equal to or greater than x2, where x1<x2 and y1>y2; and α={(y2−y1)×x+y1×x2−y2×x1}/(x2−x1), for an arbitrary normalized pixel number x equal to or greater than x1 but smaller than x2, while x1, x2, y1, and y2 are empirically determined.

The background removal threshold determiner 136 determines a background removal threshold Cut (N) of an arbitrary N-th line (referred herein to as a line N), from the provisional background removal threshold ($D_B$+α) of the line N and a background removal threshold Cut (N−1) of an (N−1)-th line (i.e. line (N−1)). It is noted that the background removal threshold Cut (N) may be determined in terms of a density of G data of 5-bit or 8-bit, in order for data of pixels of the density or lower densities to be removed by the background remover 140. That is, there may be a smoothed histogram or an unsmoothed histogram, whichever is used for that purpose.

The background removal threshold Cut (N−1) of line (N−1) is stored in the previous line background removal threshold storer 138. For line 1 (i.e., N=1) of any page, however, there is no previous line that has been given a background removal threshold, so an initial value stored in the background removal threshold initial value storer 137 is employed as a Cut (0) to determine a background removal threshold Cut (1) of line 1 of each page. This initial value is a standard background removal threshold stored in advance in the initial value storer 137. The above use of the storer 137 may be substituted by use of the provisional background removal threshold of line 1 to determine the background removal threshold Cut (1).

More specifically, the background removal threshold Cut (N) is determined by an expression, such that:

$$Cut(N)=(1-W)\times(D_B+\alpha)+W\times Cut(N-1),$$

where W is a weighting factor. In other words, for any line N, the background removal threshold Cut (N) is determined as a linear combination in terms of a sum of the provisional background removal threshold $(D_B+\alpha)$ of line N weighted by a coefficient (1−W) and a background removal threshold Cut (N−1) of previous line N−1 weighted by a coefficient W.

Accordingly, for contribution of the provisional background removal threshold $(D_B+\alpha)$ of a current line, the smaller the weighting factor W is the greater the extent becomes, and for contribution of the background removal threshold Cut (N−1) of a previous line, the larger the weighting factor W is the greater the extent becomes. In this embodiment, the weighting factor W is set up: for lines (N=1, 2, 3, et seq.) at or near the beginning in a scan of an original sheet, such that the provisional background removal threshold $(D_B+\alpha)$ of a current line (line N) provides a significant contribution, with a decreasing extent as the line is read from the beginning; and for the rest, such that the background removal threshold Cut (N−1) of a previous line (line (N−1)) has a dominant contribution. This keeps the background removal threshold from being suddenly changed by the line. It is noted that at or near the beginning in a scan of an original sheet, taken lines are each located in an end portion (e.g., in a base region in FIG. 9) of the original sheet, having a major subset of image data occupied by part of a background, with a promised high accuracy in estimation of background density $D_B$, so the contribution of the provisional background removal threshold $(D_B+\alpha)$ is set to be significant. For each combination of line N and line (N+1) in an intermediate sheet portion or therebelow, where the background density $D_B$ would be estimated on a reduced proportion of background with a population-thinned accuracy, the contribution of background removal threshold Cut (N) of the line N to be first read is set to be dominant.

Figure 9:
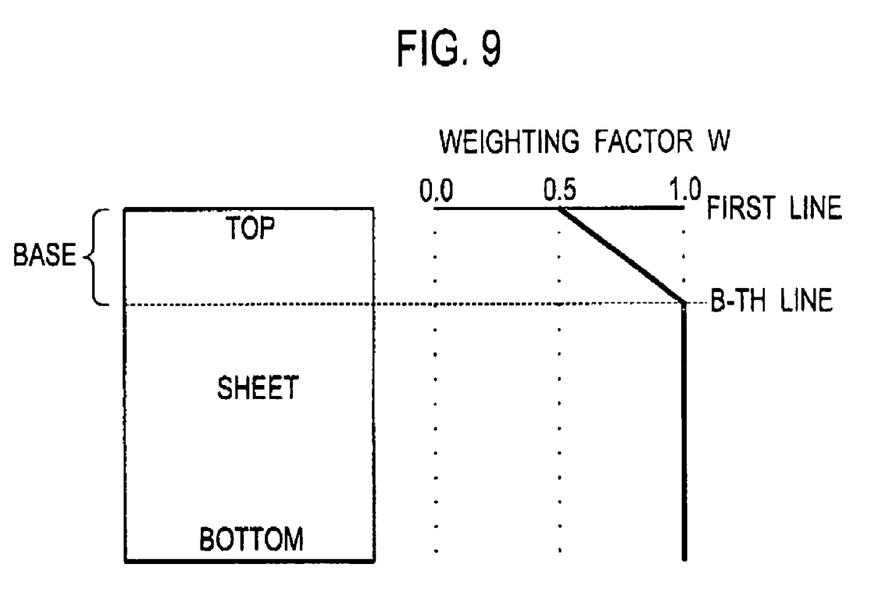
FIG. 9 is a diagram illustrating a weighting factor in the background removal threshold setter.

For a specific example, the weighting factor W to be used has a function form illustrated in FIG. 9. In this example, it is set up such that:

W=0.5 for the line 1 corresponding to the beginning of a scan of original sheet;

then, W gradually increases in a monotonic manner till it comes to W=1.0 at a line B (i.e., B-th line); and thereafter, it keeps W=1.0.

There is a base region defined between line 1 and line B (both inclusive), which is empirically determined.

In order to keep the background removal threshold Cut (N) from being excessively increased, there is a threshold ThC preset thereto. Any calculation result of Cut (N) exceeding the threshold ThC is to be replaced by this value ThC.

Figure 10:
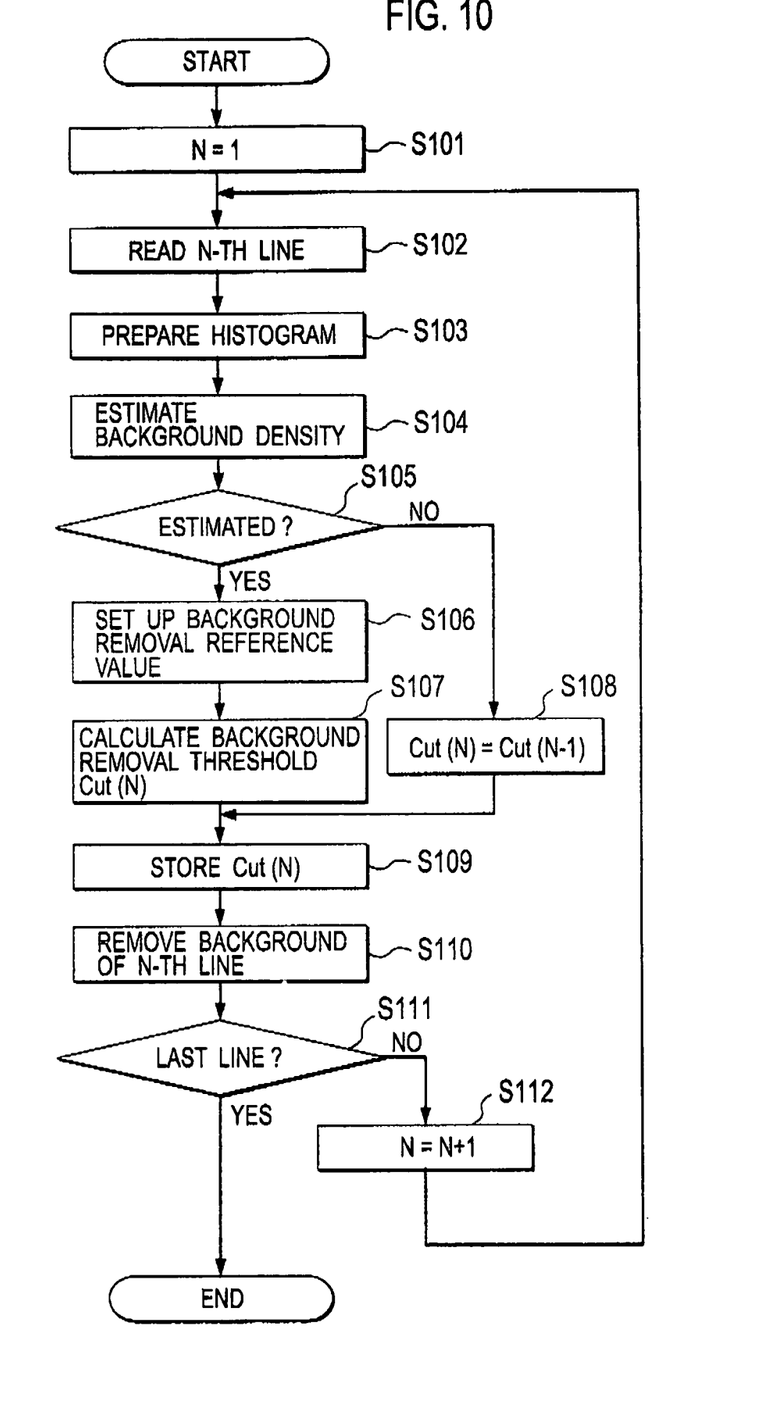
FIG. 10 is a flowchart of a background removal threshold setting process by the background removal threshold setter.

Description is now made of a process of setting a background removal threshold at the background removal threshold setter 130, with reference to a flowchart in FIG. 10. First, at a step S101, N is set to 1 to define a current line N to be processed. Then, at a step S102, the line N of image data is read from the image data storer 120. Then, at a step S103, based on the read line of image data, a histogram is prepared. This histogram is prepared by values of 8-bit G (green) data in this embodiment.

Figure 11:
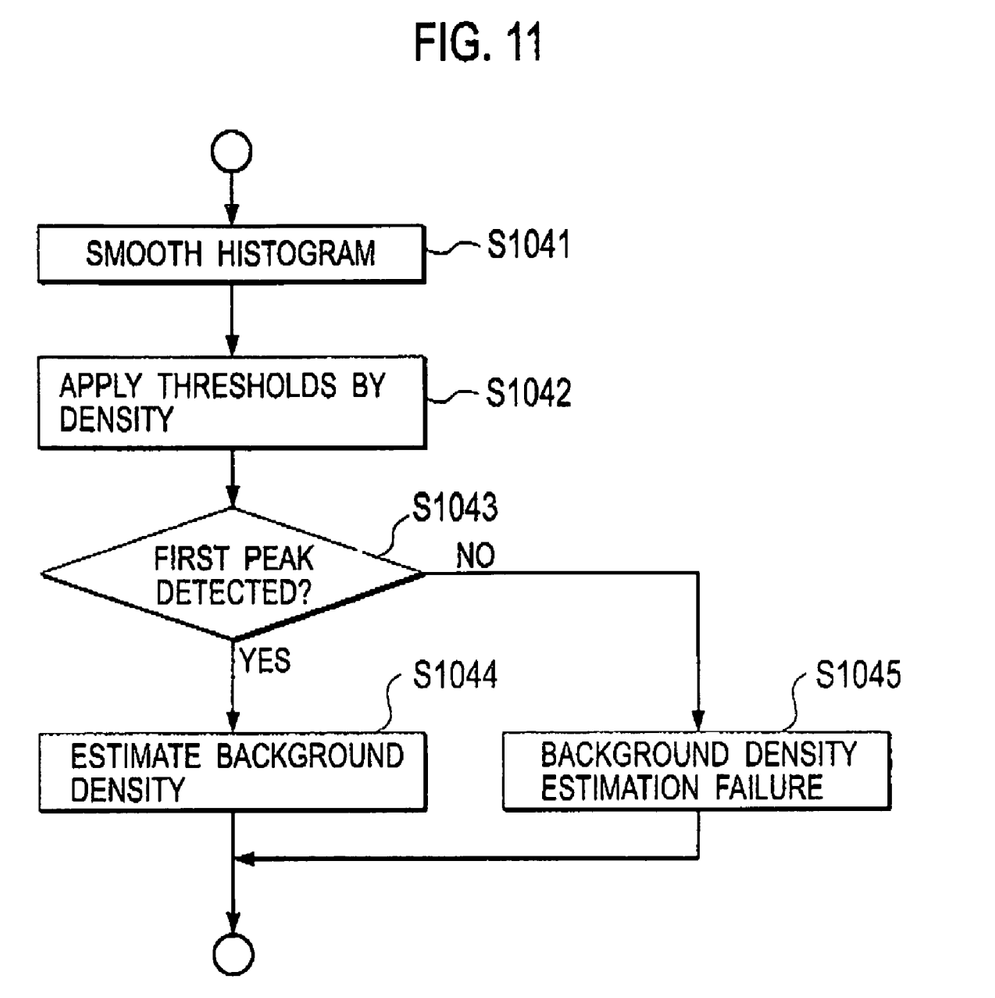
FIG. 11 is a flowchart of a background density estimating process by the background removal threshold setter.

Next, there comes a step S104 for execution of a process of estimating a background density $D_B$. FIG. 11 is a flowchart of the estimation process of background density $D_B$ at the step S104. In the background density estimation process, the flow first goes to a step S1041 for a smoothing of histogram, where out of eight bits of G data of each pixel, upper five bits are taken for reconstruction of histogram to provide a smoothed histogram, as described.

Then, the flow goes to a step S1042, where the smoothed histogram has set thereon pixel number thresholds different in value by prescribed background density ranges, as illustrated in FIG. 5F. More specifically, it has a threshold Th1 set to a density range of a width Wt from a highlight end, and a threshold Th2 smaller than Th1, set to the rest of density range.

Then, the flow goes to a step S1043 for detecting a threshold-exceeding first peak in relation to or in view of the highlight end. If it is detected (Yes at the step S1043), the flow goes to a step S1044 to estimate a density corresponding to the peak, as a background density $D_B$. Unless it is detected (No at the step S1043), the flow goes to a step S1045 to conclude a failed estimation of background density.

Next, at a step S105 in FIG. 10, there is a check for a result of estimation in the background density estimation process at the step S104. If there is an estimated background density $D_B$ (Yes at the step S105), then at a step S106, a background removal threshold reference value α is set thereof. The setting of background removal threshold reference value includes: normalizing a pixel number on the estimated background density $D_B$ to provide a normalized pixel number; and as in FIG. 8, employing a prescribed function depending thereon to determine a background removal threshold reference value α. This setting is architected to provide such a tendency that the larger the normalized pixel number is the smaller the background removal threshold reference value α becomes, and the smaller the normalized pixel number is the larger the background removal threshold reference value α becomes.

Given a background removal threshold reference value α thus set up, there comes a step S107 for calculation to determine a background removal threshold Cut (N) of current line N. The background removal threshold Cut (N) of line N is determined from a combination of a provisional background removal threshold $(D_B+\alpha)$ of the line N and a background removal threshold Cut (N−1) of the previous line (N−1), using a weighting factor W. The weighting factor W is set up so that: in a region at or near the beginning of scan of an original sheet, the provisional background removal threshold $(D_B+\alpha)$ of line N is given a significant weight; and in the rest, the background removal threshold Cut (N−1) of line (N−1) is given a dominant weight. However, the background removal threshold Cut (N) is kept from exceeding a preset threshold ThC.

On the other hand, if the background density estimation process has resulted in a failed estimation of background density $D_B$ (No at the step S105), then at a step S108, the background removal threshold Cut (N−1) of the previous line (N−1) is taken to set as a background removal threshold Cut (N) of the current line N.

As a background removal threshold Cut (N) of line N is determined, the determined background removal threshold Cut (N) is taken at a step S109 to thereby update the previous line background removal threshold storer 138. Then, at a step S110, the background remover 140, being informed of the determined background removal threshold Cut (N), executes a removal of background of line N. This background removal removes pixel data of values equal to or smaller than the background removal threshold Cut (N).

For any unprocessed line detected (No at a step S111), N is incremented at a step S112, such that N=N+1, to enter a processing of the next line. Upon completion of the background removal process of a last line (Yes at the step S111), the flow goes to an end.

(Modification)

In the embodiment above, the image reader 110 is assumed to read a frame of image data by the line as a minimum unit of length to be read for a processing. And, it will be seen that any reading unit else is employable subject to a background removal process similar in technical concept to the embodiment. For instance, the reading unit may well be, among others, a pixel region composed of a plurality of lines, or a pixel region composed of a prescribed number of pixels carrying pixel data.

Figure 12:
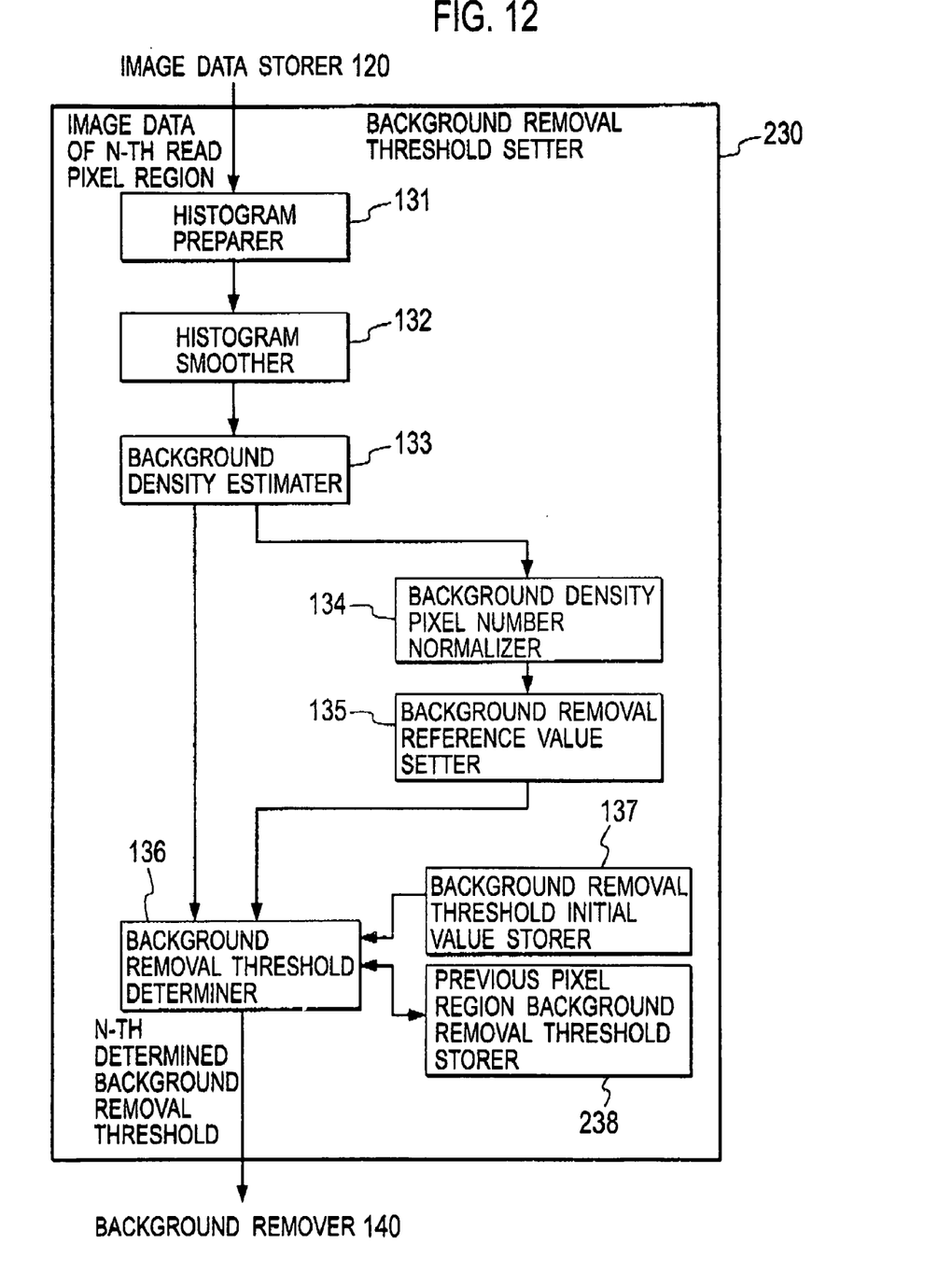
FIG. 12 is a block diagram of a modification of the background removal threshold setter in FIG. 3.

FIG. 12 is a block diagram of configuration of a modification of the background removal threshold setter 130 illustrated in FIG. 3. According to the modification, a background removal threshold setter 230 includes: a previous pixel region background removal threshold storer 238 provided as a processing element in place of the previous line background removal threshold storer 138 in the background removal threshold setter 130; and a set of processing elements 131 to 137 configured to be similar in technical concept to the rest of the background removal threshold setter 130. The previous pixel region background removal threshold storer 238 is configured for storage of a background removal threshold Cut (N−1) of an (N−1)-th read pixel region, to provide for a processing of an N-th read pixel region, as will be described.

Figure 13:
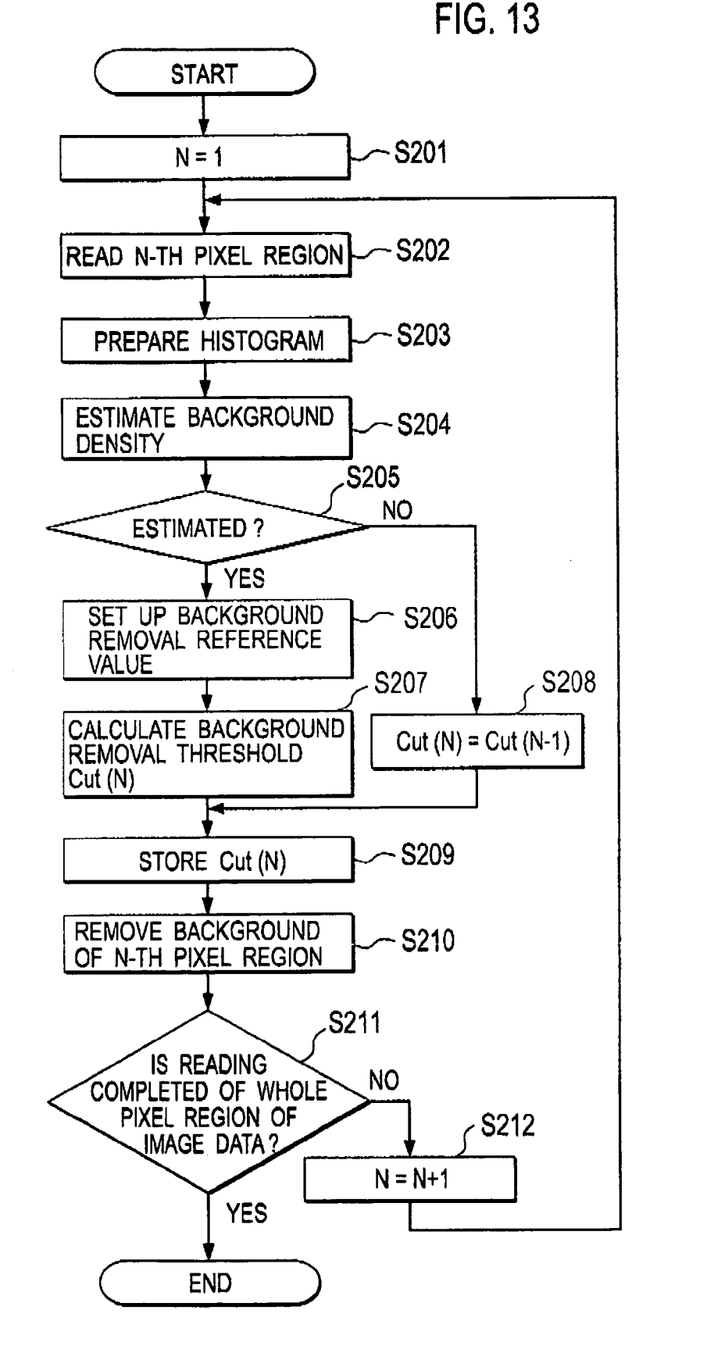
FIG. 13 is a flowchart of a background removal threshold setting process by the background removal threshold setter in FIG. 12.

FIG. 13 is a flowchart of control actions in a process of setting a background removal threshold at the background removal threshold setter 230. Description is now made of the processing elements constituting the background removal threshold setter 230, with reference to FIG. 13. This modification assumes a set of image data of pixels in a specified size of pixel region, not limited to a line, as a reading unit. The background removal threshold setter 230 is now supposed as being set so as to read an N-th pixel region at an N-th time of reading. First, at a step S201, a parameter N is set to 1. Then, at a step S202, an N-th pixel region of image data is read from an image data storer 120. Then, at a step S203, based on image data of the read pixel region, a histogram is prepared. This histogram is prepared by values of 8-bit G (green) data in this modification, as well.

Next, there comes a step S204 for execution of a process of estimating a background density $D_B$. This estimation process follows the flowchart of FIG. 11, where the flow first goes to a step S1041 for a smoothing of histogram, where out of eight bits of G data of each pixel, upper five bits are taken for reconstruction of histogram to provide a smoothed histogram. Then, the flow goes to a step S1042, where the smoothed histogram has set thereon pixel number thresholds different in value by prescribed background density ranges, as illustrated in FIG. 5F. More specifically, it has a threshold Th1 set to a density range of a width Wt from a highlight end, and a threshold Th2 smaller than Th1, set to the rest of density range. Then, the flow goes to a step S1043 for detecting a threshold-exceeding first peak in relation to the highlight end.

If it is detected (Yes at the step S1043), the flow goes to a step S1044 to estimate a density corresponding to the peak, as a background density $D_B$. Unless it is detected (No at the step S1043), the flow goes to a step S1045 to conclude a failed estimation of background density.

Next, at a step S205 in FIG. 13, there is a check for a result of estimation in the background density estimation process at the step S204. If there is an estimated background density $D_B$ (Yes at the step S205), then at a step S206, a background removal threshold reference value α is set thereon. The setting of background removal threshold reference value includes: normalizing a pixel number on the estimated background density $D_B$ to provide a normalized pixel number; and as in FIG. 8, employing a prescribed function depending thereon to determine a background removal threshold reference value α. This setting is architected to provide such a tendency that the larger the normalized pixel number is the smaller the background removal threshold reference value α becomes, and the smaller the normalized pixel number is the larger the background removal threshold reference value α becomes.

Given a background removal threshold reference value α thus set up, there comes a step S207 for calculation to determine a background removal threshold Cut (N) of image data of the N-th read pixel region. The background removal threshold Cut (N) of image data of the N-th read pixel region is determined as a linear combination of a provisional background removal threshold ($D_B+α$) of image data of the N-th read pixel region and a background removal threshold Cut (N−1) of image data of an (N−1)-th read pixel region, such that:

$$\text{Cut}(N)=(1-W)\times(D_B+α)+W\times\text{Cut}(N-1),$$

where W is a weighting factor. The weighting factor W is set up so that it becomes smaller, as the parameter N has a smaller value (that is, as it comes up to a start point of original reading). However, the background removal threshold Cut (N) is kept from exceeding a preset threshold ThC.

On the other hand, if the background density estimation process has resulted in a failed estimation of background density $D_B$ (No at the step S205), then at a step S208, the background removal threshold Cut (N−1) of image data of the (N−1)-th read pixel region is taken to set as a background removal threshold Cut (N) of image data of the N-th read pixel region.

As a background removal threshold Cut (N) of image data of the N-th read pixel region is determined, the determined background removal threshold Cut (N) is taken at a step S209 to thereby update the previous pixel region background removal threshold storer 238. Then, at a step S210, a background remover 240, being informed of the determined background removal threshold Cut (N), executes a removal of background of image data of the N-th read pixel region. This background removal removes pixel data of values equal to or smaller than the background removal threshold Cut (N).

For any unprocessed pixel region detected (No at a step S211), N is incremented at a step S212, such that N=N+1, to enter a processing of the next pixel region. Upon completion of the background removal process of a last pixel region (Yes at the step S211), the flow goes to an end.

As will be seen from the foregoing description, the embodiment above as well as the modification provides an image processing system and an image processing method adapted for a facilitated, high-speed determination of background removal threshold. The facilitated determination of background removal threshold permits the CPU 21 to work with a reduced burden on background removal processes, allowing for a shared loading on other processes. The adaptation for high-speed determination of background removal threshold is quite advantageous in situations requiring a high processing rate, such as when determining a background removal amount every line, as having discussed in the embodiment. Further, for a background removal processing, processors may well be implemented as hardware, with a small-scale simplified circuit configuration, allowing for a reduced development term and man-hour assessment.

According to the embodiment as well as the modification, the setting of a threshold for background removal is implemented by a prescribed unit of reading under page, allowing for an enhanced processing rate in determination of background removal threshold. Moreover, in part of an original, the background density is estimated on the basis of a local maximal value in view of the highlight end of a histogram, allowing for a simplified processing to implement a background removal threshold determination process.

According to the embodiment as well as the modification, the background density estimator is configured to estimate the background density of the original as a background density based on a local maximal value in view of a highlight end of a smoothed histogram of the histogram as prepared. This configuration prevents an erroneous estimation of a background density of original due to a jagged envelope of histogram.

According to the embodiment as well as the modification, the background density estimator is configured to estimate the background density of the original as a background density based on a local maximal value exceeding at least one threshold of pixel number in view of the highlight end of the smoothed histogram. This configuration prevents a maximal value defined by a small number of pixels from being mistaken as corresponding to a background density of original.

According to the embodiment as well as the modification, the background density estimator has a first threshold of pixel number set to a first range of background densities c close to the highlight end of the smoothed histogram, and a second threshold of pixel number smaller than the first threshold of pixel number set to a second range of background densities distant from the highlight end of the smoothed histogram. This configuration prevents an erroneous estimation of a background density due to an image of platen cover contained in image data.

According to the embodiment as well as the modification, the background removal reference value setter is configured to set up the background removal reference value depending on a monotone decreasing function of a proportion of the pixel number corresponding to the background density as estimated to a pixel number of the N-th read pixel region. This is because of an assumed general tendency with respect to a proportion of a pixel number on the estimated background density to a total number of pixels, such that: the larger the proportion is the steeper the crest of a peak of histogram would be, with a decreased deviation; and the smaller the proportion is the more gentle the crest of a peak of histogram would be, with an increased deviation.

According to the embodiment as well as the modification, the background removal threshold determiner is configured to determine the background removal threshold of image data of the N-th read pixel region, as a linear combination of the N-th provisional background removal threshold and the background removal threshold of image data of the (N−1)-th read pixel region. This configuration prevents the variation of background removal threshold from getting large between adjacent pixel regions.

According to the embodiment as well as the modification, as N is decreased, the linear combination has an increased ratio of a coefficient of the N-th provisional background removal threshold to a coefficient of the background removal threshold of image data of the (N−1)-th read pixel region. This is because of a promised high accuracy of background density estimation at or near the beginning in a scan of an original, where taken lines are each located in an end portion of the original, having a major subset of image data occupied by part of a background.

According to the embodiment as well as the modification, the prescribed unit of reading of original is a line. This allows for an enhanced processing rate for the background removal.

While preferred embodiments of the present invention have been described using specific terms, such description is for illustrative purposes, and it is to be understood that changes and variations may be made without departing from the spirit or scope of the following claims.

The present application claims the benefit of priority under 35 U.S.C. §119 to Japanese Patent Applications No. 2008-198564, filed on Jul. 31, 2008, No. 2008-285754, filed on Nov. 6, 2008, and No. 2009-176213, filed on Jul. 29, 2009, the entire contents of which are incorporated herein by reference.

What is claimed is:

1. An image processing system comprising:
   a histogram preparer configured to read in order a set of image data scanned from an original by a prescribed unit of reading thereof, and prepare a histogram representing pixel numbers of densities of image data of an N-th region of pixels scanned from the original, where N is an integer variable up to a maximum number of a total number of regions for reading;
   a background density estimator configured to estimate a background density of the original as a density corresponding to a local maximal value in view of a highlight end of the histogram as prepared;
   a background removal reference value setter configured to set up a background removal reference value based on a pixel number corresponding to the background density as estimated;
   a background removal threshold determiner configured to set up an N-th provisional background removal threshold as a sum of the background density as estimated and the background removal reference value as set up, and determine a background removal threshold of image data of the N-th read pixel region based on the N-th provisional background removal threshold and a background removal threshold of image data of an (N−1)-th read pixel region; and
   a background remover configured to remove a background of image data of the N-th read pixel region based on the background removal threshold of image data of the N-th read pixel region,
   wherein the background density estimator is configured to estimate the background density of the original as a background density based on a local maximal value in view of a highlight end of a smoothed histogram of the histogram as prepared and exceeding at least one threshold of pixel number in view of the highlight end of the smoothed histogram,
   and wherein the background density estimator has a first threshold of pixel number set to a first range of background densities close to the highlight end of the smoothed histogram, and a second threshold of pixel number smaller than the first threshold of pixel number set to a second range of background densities distant from the highlight end of the smoothed histogram.

2. The image processing system according to claim 1, wherein the prescribed unit of reading is a line.

3. An image processing system comprising:
a histogram preparer configured to read in order a set of image data scanned from an original by a prescribed unit of reading thereof, and prepare a histogram representing pixel numbers of densities of image data of an N-th region of pixels scanned from the original, where N is an integer variable up to a maximum number of a total number of regions for reading;
a background density estimator configured to estimate a background density of the original as a density corresponding to a local maximal value in view of a highlight end of the histogram as prepared;
a background removal reference value setter configured to set up a background removal reference value based on a pixel number corresponding to the background density as estimated;
a background removal threshold determiner configured to set up an N-th provisional background removal threshold as a sum of the background density as estimated and the background removal reference value as set up, and determine a background removal threshold of image data of the N-th read pixel region based on the N-th provisional background removal threshold and a background removal threshold of image data of an (N−1)-th read pixel region; and
a background remover configured to remove a background of image data of the N-th read pixel region based on the background removal threshold of image data of the N-th read pixel region,
wherein the background removal reference value setter is configured to set up the background removal reference value depending on a monotone decreasing function of a proportion of the pixel number corresponding to the background density as estimated to a pixel number of the N-th read pixel region.

4. The image processing system according to claim 3, wherein the background density estimator is configured to estimate the background density of the original as a background density based on a local maximal value in view of a highlight end of a smoothed histogram of the histogram as prepared.

5. The image processing system according to claim 4, wherein the background density estimator is configured to estimate the background density of the original as a background density based on a local maximal value exceeding at least one threshold of pixel number in view of the highlight end of the smoothed histogram.

6. The image processing system according to claim 5, wherein the background density estimator has a first threshold of pixel number set to a first range of background densities close to the highlight end of the smoothed histogram, and a second threshold of pixel number smaller than the first threshold of pixel number set to a second range of background densities distant from the highlight end of the smoothed histogram.

7. An image processing system comprising:
a histogram preparer configured to read in order a set of image data scanned from an original by a prescribed unit of reading thereof, and prepare a histogram representing pixel numbers of densities of image data of an N-th region of pixels scanned from the original, where N is an integer variable up to a maximum number of a total number of regions for reading;
a background density estimator configured to estimate a background density of the original as a density corresponding to a local maximal value in view of a highlight end of the histogram as prepared;
a background removal reference value setter configured to set up a background removal reference value based on a pixel number corresponding to the background density as estimated;
a background removal threshold determiner configured to set up an N-th provisional background removal threshold as a sum of the background density as estimated and the background removal reference value as set up, and determine a background removal threshold of image data of the N-th read pixel region based on the N-th provisional background removal threshold and a background removal threshold of image data of an (N−1)-th read pixel region; and
a background remover configured to remove a background of image data of the N-th read pixel region based on the background removal threshold of image data of the N-th read pixel region,
wherein the background removal threshold determiner is configured to determine the background removal threshold of image data of the N-th read pixel region, as a linear combination of the N-th provisional background removal threshold and the background removal threshold of image data of the (N−1)-th read pixel region.

8. The image processing system according to claim 7, wherein as N is decreased, the linear combination has an increased ratio of a coefficient of the N-th provisional background removal threshold to a coefficient of the background removal threshold of image data of the (N−1)-th read pixel region.

9. An image processing method comprising the steps of:
reading in order a set of image data scanned from an original by a prescribed unit of reading thereof, preparing a histogram representing pixel numbers of densities of image data of an N-th region of pixels scanned from the original, where N is an integer variable up to a maximum number a total number of regions for reading;
estimating a background density of the original as a density corresponding to a local maximal value in view of a highlight end of the histogram as prepared;
setting up a background removal reference value based on a pixel number corresponding to the background density as estimated;
setting up an N-th provisional background removal threshold as a sum of the background density as estimated and the background removal reference value as set up, determining a background removal threshold of image data of the N-th read pixel region based on the N-th provisional background removal threshold and a background removal threshold of image data of an (N−1)-th read pixel region; and
removing a background of image data of the N-th read pixel region based on the background removal threshold of image data of the N-th read pixel region,
wherein the background density estimation comprises estimating the background density of the original as a background density based on a local maximal value in view of a highlight end of a smoothed histogram of the histogram as prepared and exceeding at least one threshold of pixel number in view of the highlight end of the smoothed histogram,
and wherein the background density estimation comprises using a first threshold of pixel number set to a first range of background densities close to the highlight end of the smoothed histogram, and a second threshold of pixel number smaller than the first threshold of pixel number set to a second range of background densities distant from the highlight end of the smoothed histogram.

10. The method according to claim 9, wherein the prescribed unit of reading is a line.

11. An image processing method comprising the steps of
reading in order a set of image data scanned from an original by a prescribed unit of reading thereof, preparing a histogram representing pixel numbers of densities of image data of an N-th region of pixels scanned from the original, where N is an integer variable up to a maximum number a total number of regions for reading;
estimating a background density of the original as a density corresponding to a local maximal value in view of a highlight end of the histogram as prepared;
setting up a background removal reference value based on a pixel number corresponding to the background density as estimated;
setting up an N-th provisional background removal threshold as a sum of the background density as estimated and the background removal reference value as set up, determining a background removal threshold of image data of the N-th read pixel region based on the N-th provisional background removal threshold and a background removal threshold of image data of an (N−1)-th read pixel region; and
removing a background of image data of the N-th read pixel region based on the background removal threshold of image data of the N-th read pixel region,
wherein the setting up the background removal reference value comprises setting up the background removal reference value depending on a monotone decreasing function of a proportion of the pixel number corresponding to the background density as estimated to a pixel number of the N-th read pixel region.

12. An image processing method comprising the steps of:
reading in order a set of image data scanned from an original by a prescribed unit of reading thereof, preparing a histogram representing pixel numbers of densities of image data of an N-th region of pixels scanned from the original, where N is an integer variable up to a maximum number a total number of regions for reading;
estimating a background density of the original as a density corresponding to a local maximal value in view of a highlight end of the histogram as prepared;
setting up a background removal reference value based on a pixel number corresponding to the background density as estimated;
setting up an N-th provisional background removal threshold as a sum of the background density as estimated and the background removal reference value as set up, determining a background removal threshold of image data of the N-th read pixel region based on the N-th provisional background removal threshold and a background removal threshold of image data of an (N−1)-th read pixel region; and
removing a background of image data of the N-th read pixel region based on the background removal threshold of image data of the N-th read pixel region,
wherein the determining the background removal threshold comprises determining the background removal threshold of image data of the N-th read pixel region, as a linear combination of the N-th provisional background removal threshold and the background removal threshold of image data of the (N−1)-th read pixel region.

13. The method according to claim 12, wherein as N is decreased, the linear combination has an increased ratio of a coefficient of the N-th provisional background removal threshold to a coefficient of the background removal threshold of image data of the (N−1)-th read pixel region.

* * * * *